United States Patent
Badrak et al.

(10) Patent No.: US 9,631,157 B2
(45) Date of Patent: Apr. 25, 2017

(54) CU—NI—SN ALLOY OVERLAY FOR BEARING SURFACES ON OILFIELD EQUIPMENT

(71) Applicant: Weatherford Technology Holdings, LLC, Houston, TX (US)

(72) Inventors: Robert P. Badrak, Sugar Land, TX (US); William R. Howie, Katy, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 196 days.

(21) Appl. No.: 14/513,315

(22) Filed: Oct. 14, 2014

(65) Prior Publication Data

US 2015/0111793 A1 Apr. 23, 2015

Related U.S. Application Data

(60) Provisional application No. 61/892,889, filed on Oct. 18, 2013.

(51) Int. Cl.
  *C10M 103/04* (2006.01)
  *C23C 4/08* (2016.01)
  (Continued)

(52) U.S. Cl.
  CPC ............ *C10M 103/04* (2013.01); *B23K 9/04* (2013.01); *B23K 9/167* (2013.01); *B23K 10/027* (2013.01); *B23K 26/147* (2013.01); *B23K 26/34* (2013.01); *C23C 4/08* (2013.01); *C23C 4/129* (2016.01); *C23C 4/131* (2016.01); *C23C 4/134* (2016.01); *C23C 4/18* (2013.01); *C23C 24/106* (2013.01); *F16C 33/121* (2013.01); *F16C 33/14* (2013.01);
  (Continued)

(58) Field of Classification Search
  CPC ...................................... F16C 33/124
  USPC ................................. 508/100–109
  See application file for complete search history.

(56) References Cited

U.S. PATENT DOCUMENTS 3,340,049 A 9/1967 Quaas et al.
4,388,270 A 6/1983 Stavish et al.
(Continued)

FOREIGN PATENT DOCUMENTS

EP 0454229 A1 10/1991
JP H03 126855 A 5/1991

OTHER PUBLICATIONS

Materion Brush Performance Alloys, "Formability of Materion Brush Performance Alloys Strip Products," Technical Brief, copyright 2011.
(Continued)

Primary Examiner — Ellen McAvoy
(74) Attorney, Agent, or Firm — Blank Rome LLP

(57) ABSTRACT

A bearing surface of an oilfield component is treated by applying a surface treatment having a low coefficient of friction to the bearing surface of the oilfield component by weld fusing an overlay of a Cu—Ni—Sn alloy material to the bearing surface. Weld fusing the overlay of the Cu—Ni—Sn alloy material to the bearing surface can involve laser surface cladding the overlay of the Cu—Ni—Sn alloy material to the bearing surface, gas tungsten arc welding the overlay of the Cu—Ni—Sn alloy material to the bearing surface, or plasma tungsten arc welding the overlay of the Cu—Ni—Sn alloy material to the bearing surface.

26 Claims, 16 Drawing Sheets

(51) Int. Cl.
| | |
|---|---|
| C23C 4/18 | (2006.01) |
| B23K 9/04 | (2006.01) |
| F16C 33/12 | (2006.01) |
| F16C 33/14 | (2006.01) |
| B23K 9/167 | (2006.01) |
| B23K 10/02 | (2006.01) |
| B23K 26/14 | (2014.01) |
| B23K 26/34 | (2014.01) |
| C23C 4/131 | (2016.01) |
| C23C 4/129 | (2016.01) |
| C23C 4/134 | (2016.01) |
| C23C 24/10 | (2006.01) |
| C22C 9/06 | (2006.01) |

(52) U.S. Cl.
CPC .............. C22C 9/06 (2013.01); F16C 2204/10 (2013.01); F16C 2223/42 (2013.01); F16C 2223/46 (2013.01); F16C 2352/00 (2013.01)

(56) References Cited

U.S. PATENT DOCUMENTS

| | | | |
|---|---|---|---|
| 4,523,365 A | 6/1985 | Richmond | |
| 4,641,976 A | 2/1987 | Kar | |
| 5,004,581 A | 4/1991 | Takagi et al. | |
| 5,196,074 A | 3/1993 | Welter et al. | |
| 5,288,457 A * | 2/1994 | Boegel | C22C 9/02 420/470 |
| 5,527,113 A * | 6/1996 | Kembaiyan | C22C 1/0425 384/912 |
| 6,033,117 A | 3/2000 | Cariveau et al. | |
| 6,163,961 A * | 12/2000 | McMeekin | F16C 33/14 29/898.056 |
| 6,416,877 B1 | 7/2002 | Perrin et al. | |
| 6,557,654 B1 | 5/2003 | Murray | |
| 6,716,292 B2 * | 4/2004 | Nielsen, Jr. | C22C 9/02 148/433 |
| 7,926,593 B2 | 4/2011 | Bailey et al. | |
| 2002/0122722 A1 | 9/2002 | Bertin et al. | |
| 2006/0108119 A1 | 5/2006 | Bailey et al. | |
| 2007/0243406 A1 * | 10/2007 | Trybus | B32B 15/01 428/648 |
| 2009/0311129 A1 * | 12/2009 | Harakawa | B22F 5/106 420/473 |
| 2012/0064365 A1 * | 3/2012 | Takayanagi | B22F 7/04 428/648 |

OTHER PUBLICATIONS

Materion Brush Performance Alloys, "Soldering Copper Alloy Strip," Technical Brief, copyright 2011.
Materion Brush Performance Alloys, "Surface Coating of Copper Alloy Strip for Electrical Connector Applications," Technical Brief, copyright 2011.
Materion Brush Performance Alloys, "Copper Beryllium Alloys," obtained from http://materion.com, copyright 2013.
Materion Brush Performance Alloys, "Copper Nickel Tin Alloy Strip," obtained from http://materion.com, copyright 2013.
Materion Brush Performance Alloys, "TIG Rod," obtained from http://materion.com, copyright 2013.
"Guidelines to Gas Tungsten Arc Welding (GTAW)," UG-215 994, dated Jul. 2003.
National Bronze & Metals, Inc., "ASM 4590: Nickel Aluminum Bronze," Brochure, undated, obtained on Oct. 15, 2013.
Thyssenkrupp Materials NA, "Alloys for Oil & Gas Applications," Brochure, undated, obtained on Oct. 15, 2013.
Materion Brush Performance Alloys, "Weldpak," obtained from http://materion.com, copyright 2013.
Materion Brush Performance Alloys, "Weldpak XL," obtained from http://materion.com, copyright 2013.
Tumuluru, M., et al., "Weld Ductility Studies of a Tin-Modified Copper-Nickel Alloy," Welding Research Supplement, pp. 197-204, May 1990.
Search Report in counterpart EP Application EP 14189428.7, dated May 8, 2015.
First Office Action in counterpart Canadian Application 2,867,815, dated Nov. 4, 2015, 4-pgs.

* cited by examiner

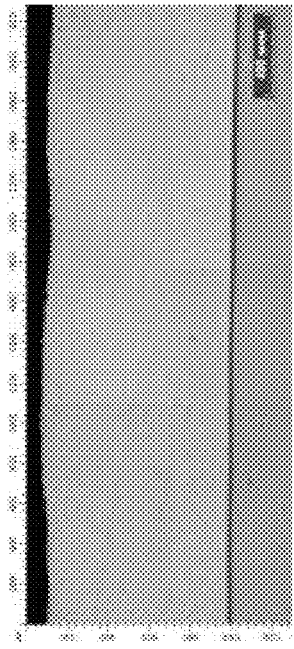
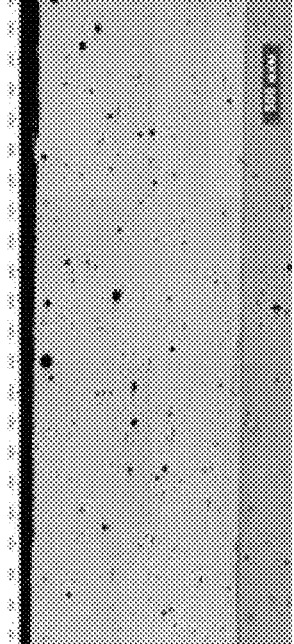
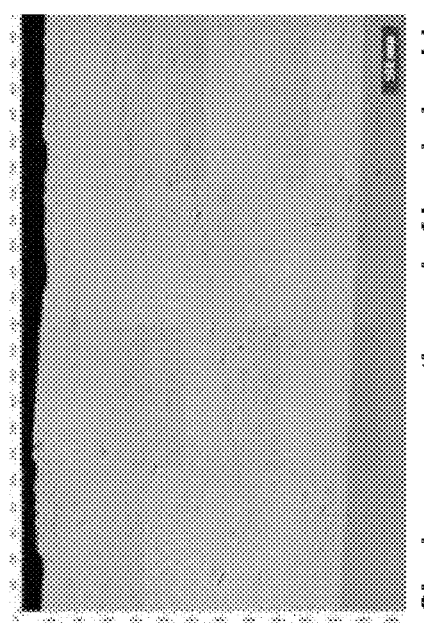
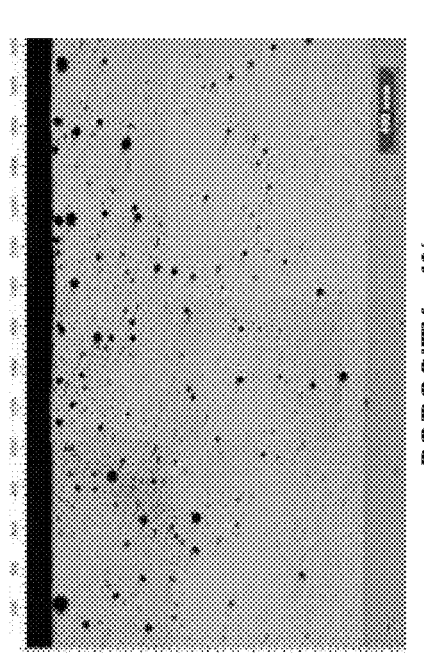
TABLE 2: POROSITY OF OVERLAYS
Fig. 11

Table 3: Quantitative analysis of gray phase evolution

| Parameters | As-applied | | Aged | | Quenched plus aged |
|---|---|---|---|---|---|
| | Avarege structure | Structure of overlay close to fusion zone | Avarege structure | Structure of overlay close to fusion zone | |
| GTAW | | | | | |
| volume fraction, % | 2.06 | 2.09 | 1.59 | 1.62 | No gray phase |
| average length, m | 1.12 | 1.47 | 0.78 | 1.19 | |
| average square, m$^2$ | 0.97 | 1.53 | 0.71 | 0.94 | |
| PTAW | | | | | |
| volume fraction, % | 2.56 | 2.57 | 2.05 | 2.08 | No gray phase |
| average length, m | 1.27 | 1.49 | 0.84 | 1.12 | |
| average square, m$^2$ | 1.39 | 1.71 | 0.93 | 1.09 | |

*Fig. 12*

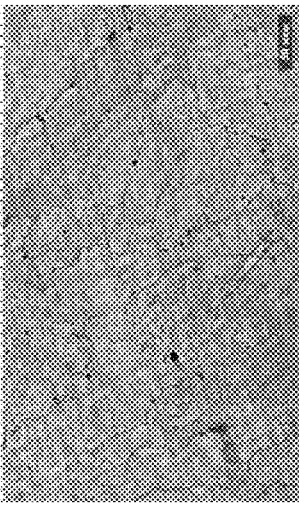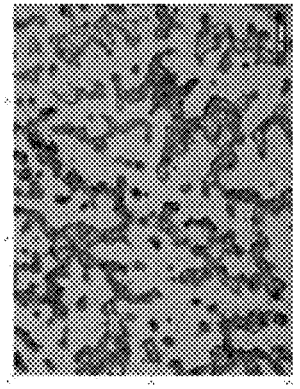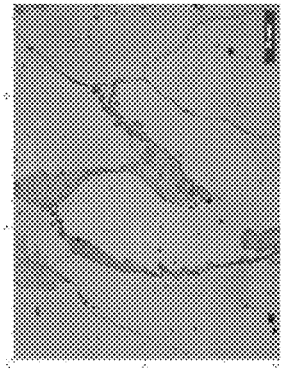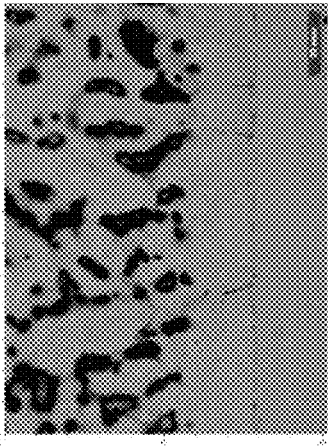
TABLE 4: Analysis of Etched Structure After Heat Treatment
Fig. 13

CU—NI—SN ALLOY OVERLAY FOR BEARING SURFACES ON OILFIELD EQUIPMENT

CROSS-REFERENCE TO RELATED APPLICATIONS

This application claims the benefit of U.S. Prov. Appl. No. 61/892,889, filed 18 Oct. 2013, which is incorporated herein by reference.

BACKGROUND OF THE DISCLOSURE

Certain alloys are useful for bearings, bushings, and the like on equipment because the alloys have a low coefficient of friction, sufficient load bearing properties (e.g., hardness), and other suitable attributes. Copper beryllium alloys and nickel aluminum bronze alloys are examples of alloys used for bearings, bushings, and the like. The alloys can be used for various types of bearing surfaces. In the oil and gas industry, for example, the alloys can be used for rock bit bearings, bushings, and washers and can be used in downhole drilling tools, wellhead equipment, and BOP components.

Another alloy that is used for various purposes is the copper-nickel-tin alloy class. This alloy class is typically produced as a strip or other solid form produced by a cast or powdered metal process. Due to the way it is made, this alloy has particular size limitations and has a relatively high cost per unit weight. In general, the alloy is used for electronic connectors, switches, sensors, and the like. The alloy can also be used for smaller bearing applications having sizes of about 4 to 8 inches or less in diameter.

One use of the copper-nickel-tin alloy for bearing surfaces in oilfield equipment is disclosed in U.S. Pat. No. 4,641,976 to Smith International, Inc. As disclosed, a spinodal alloy consisting essentially of copper-nickel-tin is used for bearing surfaces formed between roller cutter cones of sealed-bearing rock bits. Unfortunately, if an application requires larger bearings, bushings, or the like for larger bearing surfaces, this alloy class is not used due to the limitations in how the alloy can be manufactured and produced or due to the economics are unfavorable.

Despite the alloy's limitations, some equipment in oil and gas applications having large bearing surfaces could still benefit from the characteristics of the copper-nickel-tin alloy class. For example, a rotating control device (RCD) is a piece of oilfield equipment for creating a pressure-tight barrier in a wellbore annulus so returning fluids can be contained and diverted. The device may have a bearing surface that can be in the 30-inch diameter range. What is needed is a way to use the alloy of the copper-nickel-tin class for such a large application or for a small region of such a large member.

Cladding is a procedure that welds metal on a surface of a workpiece for providing corrosion resistance, wear resistance, and the like. Frequently, the cladding material is different than the base metal. There are some existing weld overlays and high velocity oxy-fuel (HVOF) coatings of other alloy classes, such as the nickel-chromium-silicon-boron alloys. These overlays have drawbacks that make them undesirable in some applications.

The subject matter of the present disclosure is directed to overcoming, or at least reducing the effects of, one or more of the problems set forth above.

SUMMARY OF THE DISCLOSURE

As disclosed herein, a method of treating a bearing surface of an oilfield component involves applying a surface treatment having a low coefficient of friction to the bearing surface of the oilfield component by weld fusing an overlay of a Cu—Ni—Sn alloy material to the bearing surface. Weld fusing the overlay can involve laser surface cladding the overlay, gas tungsten arc welding the overlay, or plasma tungsten arc welding the overlay of the Cu—Ni—Sn alloy material to the bearing surface.

When welding the overlay with the plasma tungsten arc welding or laser welding processes, a gas atomized powder of the Cu—Ni—Sn alloy material can be used. In weld fusing the overlay, the overlay can be applied as one or more layers, which can result in an overall thickness of the overlay of about 0.065 inch to 0.125 inch.

The method can further involve heat treating the overlay, such as by using solution or spinodal hardening heat treatments. Additionally, the method can further involve rapid cooling the overlay after heat treating the overlay. For example, one way to heat treat the overlay can involve first annealing the overlay, second quenching the overlay, and third spinodal hardening the overlay. The Cu—Ni—Sn alloy material can comprise 15% Ni and 8% Sn with a remaining balance of Cu.

As disclosed herein, an oilfield component has a bearing surface treated according to a treatment method comprising applying a surface treatment having a low coefficient of friction to the bearing surface of the oilfield component by weld fusing an overlay of a Cu—Ni—Sn alloy material to the bearing surface. Again, the weld fusing of the overlay of the Cu—Ni—Sn alloy material to the bearing surface can involve laser surface cladding the overlay, gas tungsten arc welding the overlay, plasma tungsten arc welding the overlay to the bearing surface, or other arc welding techniques.

One of the potential limitations of the disclosed weld overlay process is liquid metal embrittlement (LME) that results from copper infiltration into steel-based substrates during the overlay operation. At overlay molten temperatures, the overlay alloy penetrates into an unprotected steel surface causing cracks and crack paths during solidification. The root cause is the limited solid solubility of copper in steel. This potential problem was overcome by first applying a boundary protective layer of a nickel base alloy. The copper is soluble in the nickel of the boundary protective layer, avoiding the presence of cracks and potential crack paths.

In general, the oilfield component can be a component of oilfield equipment selected from the group consisting of a rotating control device, tubular running service equipment, measuring while drilling (MWD) tool, logging while drilling (LWD) tool, rotary steerable tool, low torque and drag tool, and wireline tool.

The foregoing summary is not intended to summarize each potential embodiment or every aspect of the present disclosure.

BRIEF DESCRIPTION OF THE DRAWINGS

FIG. 11 includes a table showing analysis of the porosity of the overlays applied by the GTAW and PTAW processes.

FIG. 12 illustrates a table presenting the quantitative analysis of gray phase evolution in overlay samples.

FIG. 13 illustrates a table showing the etched structure of the GTAW-applied overlays after heat treatment.

DETAILED DESCRIPTION OF THE DISCLOSURE

A. Low Friction Bearing Material Surfacing

According to the present disclosure, surfacing techniques apply an overlay having a low coefficient of friction to a bearing surface using a weld fusion process on the bearing surface of a workpiece, such as an oilfield component or piece of oilfield equipment. The disclosed overlay is applied to the workpiece to improve the structure and hardness of the workpiece's bearing surface and can be used instead of (or in addition to) bearings, bushings, washers, and the like.

The disclosed overlay is composed primarily of a Cu—Ni—Sn alloy material. The preferred overlay composition contains roughly 15% nickel and 8% tin with the remaining balance being substantially copper. The copper-nickel-tin alloy for the disclosed overlay has good strength, anti-galling properties, and low coefficient of friction, making it useful as a low friction bearing material for equipment in the oilfield and other industries.

1. Weld Fusion Overlay Process

Figure 1A:
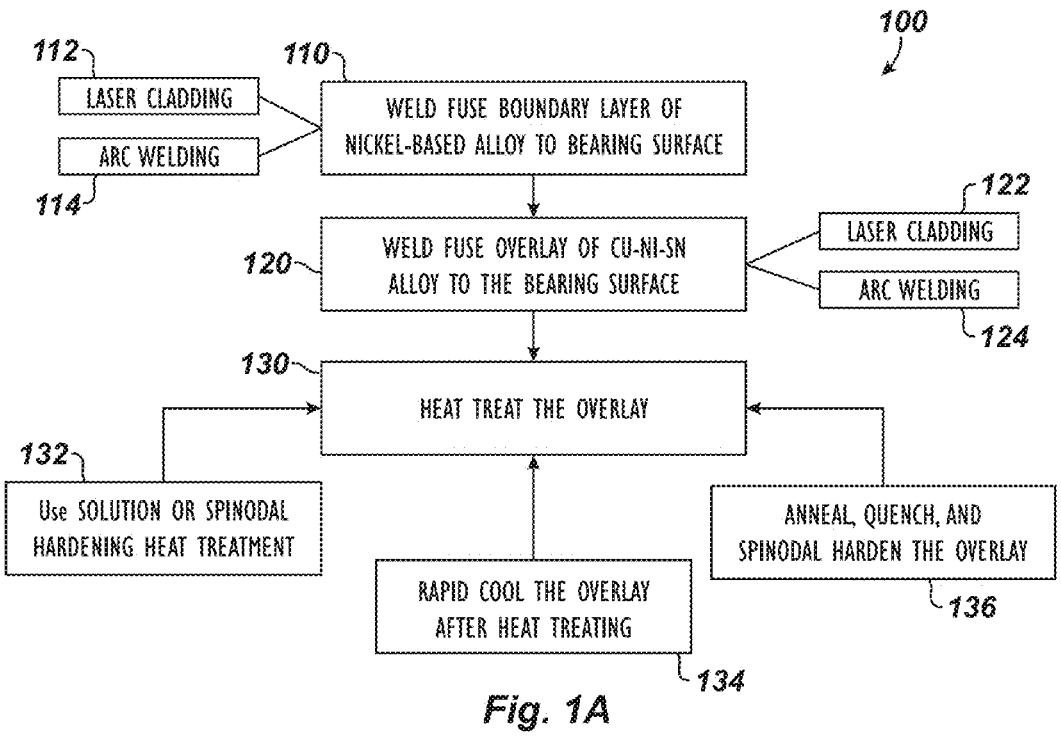
FIGS. 1A-1B show processes for treating a bearing surface of an oilfield component according to the present disclosure.

FIG. 1A shows a process 100 for treating a bearing surface of an oilfield component according to the present disclosure. In one embodiment, a surface treatment having a low coefficient of friction is applied directly to the bearing surface of the oilfield component by weld fusing an overlay of a Cu—Ni—Sn alloy material to the bearing surface (Block 120). The weld fusing of the overlay can involve laser surface cladding (Block 122), arc welding (Block 124), or other weld fusing technique to apply the overlay of the Cu—Ni—Sn alloy material to the bearing surface. The arc welding process (Block 124) can involve gas tungsten arc welding or plasma tungsten arc welding the overlay of the Cu—Ni—Sn alloy material to the bearing surface. When plasma tungsten arc welding is used, a gas-atomized powder is preferably used for the Cu—Ni—Sn alloy material.

After application of the weld overlay, a number of hardening and other treatments can be used. In particular, the process 100 can involve heat treating the overlay (Block 130). For example, solution or spinodal hardening heat treatments can be used (Block 132). Rapid cooling of the overlay can be performed after heat treating the overlay (Block 134). In fact, one process for treating the overlay can involve first annealing the overlay, then quenching the overlay, and finally spinodal hardening the overlay (Block 136). Once the overlay is applied to the bearing surface, various steps, such as machining and the like, can be performed to prepare the bearing surface for use.

The post weld heat treatment of the overlay in Block 130 can be accomplished using traditional heat treat processes (e.g., furnace heat treatment) or using local heating techniques, such as laser or induction surface heat treatment. In one advantage, the local heating techniques can have minimal effects on the underlying substrate of the bearing surface, whereas surface heating techniques have cycle time limitations associated with them.

As noted above, the overlay can be applied using a variety of weld fusion techniques (Block 120), including laser cladding (Block 122) and arc welding (Block 124) (e.g., gas tungsten arc welding (GTAW) and plasma tungsten arc welding (PTAW)). During application using the disclosed weld fusion techniques, the overlays may be subjected to a number of heat treatment conditions, such as aging, annealing, quenching, or the like.

Figures 2A, 2B, 2C:
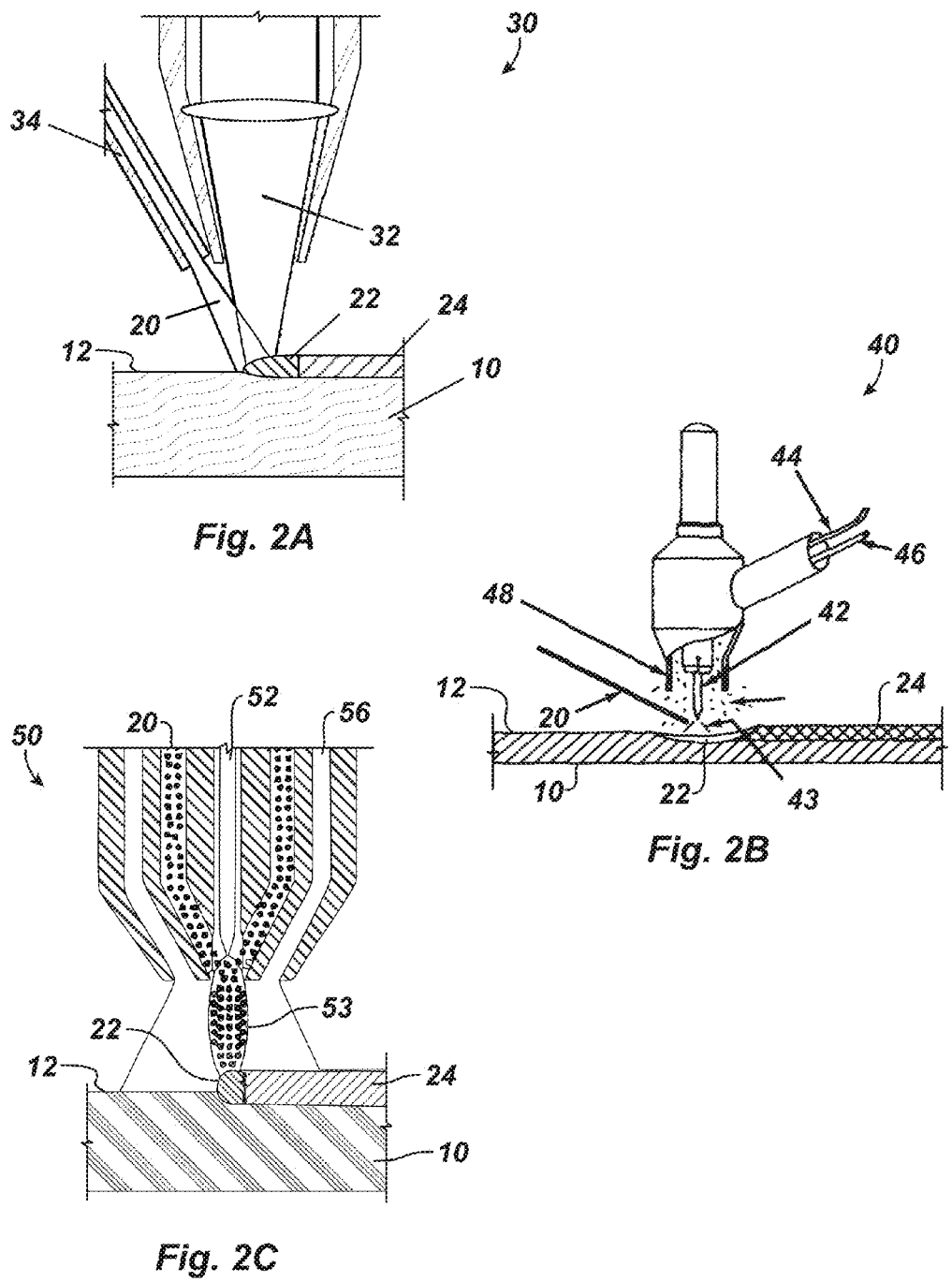
FIG. 2A illustrates a laser cladding process according to the present disclosure.
FIG. 2B illustrates a gas tungsten arc welding (GTAW) process according to the present disclosure.
FIG. 2C illustrates a plasma tungsten arc welding (PTAW) process according to the present disclosure.

Particular details of how the weld fusion techniques (Block 120), such as laser cladding (Block 122) and arc welding (Block 124) (e.g., gas tungsten arc welding (GTAW) and plasma tungsten arc welding (PTAW)), are conducted are known in the art so they are only briefly repeated here. For example, FIG. 2A illustrates a laser cladding process that can be used according to the present disclosure to treat a bearing surface 12 of an oilfield component 10. Overlay material 20 is fed as a powder through a delivery tube 34, although it could be fed as a rod, to the focused beam 32 of a laser 30. The overlay material 20 is melted and consolidated with the base metal of the oilfield component's bearing surface 12 at a weld fusion point 22 to create an overlay 24.

In another example, FIG. 2B illustrates a gas tungsten arc welding (GTAW) process that can be used according to the present disclosure to treat the bearing surface 12 of the oilfield component. A tungsten electrode 42 of a held head 40 conducts an electric arc 43 from a power source 44 to the oilfield component 10. An inert shielding gas 46 is conducted by gas nozzle 48 around the electrode 42, and the overlay material 20 is fed as a rod to the weld fusion point 22 having a plasma composed of ionized gas and metal vapors to create the overlay 24.

In yet another example, FIG. 2C illustrates a plasma tungsten arc welding (PTAW) process that can be used according to the present disclosure to treat the bearing surface 12 of the oilfield component 10. This PTAW process is similar to the GTAW process. A tungsten electrode 52 conducts an electric arc 53 from a power source (not shown) to the oilfield component 10 in a transferred arc technique or to the nozzle 50 in a non-transferred arc. A plasma gas is fed through the nozzle 52 to a constriction around the electrode 52, and an inert shielding gas 56 is conducted through the nozzle 50 to form an envelope around the arc 53. As shown, the overlay material 20 can be fed as a powder to the weld fusion point 22 formed by the plasma, although a filler rod could be used, to create the overlay 24.

Other weld fusion techniques can be used, including, but not limited to, other arc welding techniques, such as Flux-cored arc welding (FCAW), or other cladding techniques.

In the weld fusing techniques disclosed herein, liquid metal embrittlement (LME) is one potential limitation of the disclosed weld overlay process 100. LME results from copper infiltration into the steel-based substrate during the overlay operation. At overlay molten temperatures, the overlay alloy penetrates into an unprotected steel bearing surface causing cracks and crack paths during solidification. The root cause is the limited solid solubility of copper in steel.

To overcome this potential limitation, the weld fusion techniques (Block 120: FIG. 1A) for the weld overlay preferably involve an initial step of first applying a boundary protective layer of a nickel-based alloy to the bearings surface of the steel substrate (Block 110) before weld fusing the overlay (Block 120). The copper is soluble in the nickel of the boundary protective layer, avoiding the creation of cracks and potential crack paths.

The thickness of this boundary protective layer of a nickel-based alloy can depend on the implementation, the expected temperatures, the amount of overlay to be formed, etc. In general, the nickel-based alloy for the protective layer can include, for example, Hastelloy® C-276 alloy, C-22 alloy, or 725 alloy. (HASTELLOY is a registered trademark of HAYNES INTERNATIONAL, INC.)

The copper from the weld overlay alloy comes out of solution during solidification at the grain boundary. The nickel-based alloy is predominately nickel, which accommodates the copper and prevents the detrimental effect of its solidification. The boundary layer can be applied to have a thickness of 1/32 to 3/16-in, and the boundary layer can be applied using a weld-fusion process similar to that used for the weld overlay. For example, the overlay can be weld fused on the bearing surface using laser surface cladding (Block 112) or arc welding (Block 114) (e.g., gas tungsten arc welding or plasma tungsten arc welding). The boundary layer can also be applied as a mechanically bonded coating using a twin-wire arc spray or a high velocity spray process.

2. Non-Weld Fusion Overlay Process

In the process 100 of FIG. 1A, weld fusion techniques have been disclosed for producing the weld overlay on the bearing surface and/or for producing the boundary layer before application of the weld overlay. Rather than using weld fusion techniques, non-weld fusion techniques can also be used to apply the overlay and/or boundary layer.

Figure 1B:
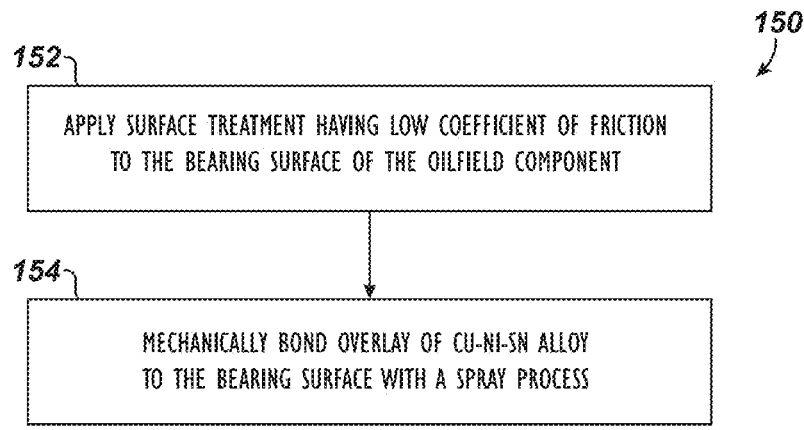

As shown in FIG. 1B, to treat a bearing surface of an oilfield component, a surface treatment having a low coefficient of friction can be applied in an alternative process 150 (Block 152) by mechanically bonding an overlay of a Cu—Ni—Sn alloy material to the bearing surface with a spray process (Block 154), such as twin arc spray and high velocity oxy-fuel (HVOF) surfacing techniques. When non-weld fusion techniques are used to apply the overlay, such as when twin-arc spray and high velocity spray are used, then application of the boundary layer is not necessary.

Although these non-weld fusion techniques can be used, they have some limitations. The disadvantage of the non-weld fusion techniques, such as the arc spray methods, includes the relatively low bond strengths that limit their use to only applications that do not require high service loads, etc. Coatings applied in these non-weld fusion techniques may also not be able to withstand the thermal expansions that result from bearing applications or changes in product application temperature. A further limitation may be the limited ability to harden these applied coatings.

Nevertheless, the weld overlay can be applied using a non-weld fusion technique, such as twin-arc spray and high velocity oxy-fuel spray. These techniques will not produce a high-bond strength, and instead they produce mechanical bonding. For this reason, these non-welding techniques are preferably used for bearing surfaces other than those bearing surfaces that are heavily loaded.

Figure 2D:
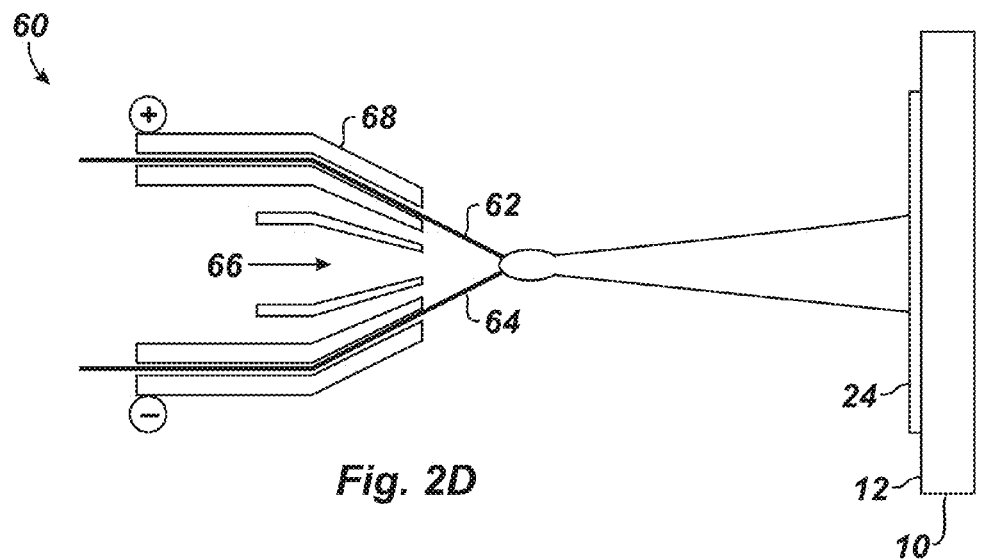
FIG. 2D illustrates a twin-wire arc spray process according to the present disclosure.

Particular details of how the non-weld fusion techniques are conducted are known in the art so they are only briefly repeated here. FIG. 2D illustrates a twin-wire arc spray process 60 according to the present disclosure. In this process, two consumable wires 62, 64 of the overlay material produce electric arc energy that heats a gas 66 fed inside a nozzle 68. The ionized and expanding gas 66 exits as a jet from the nozzle 68 to where the wires 62, 64 are positioned. The material of the wires 62, 64 is melted and propelled in an atomized state by the jet as an overlay 24 against the bearing surface 12 of the component 10.

Figure 2E:
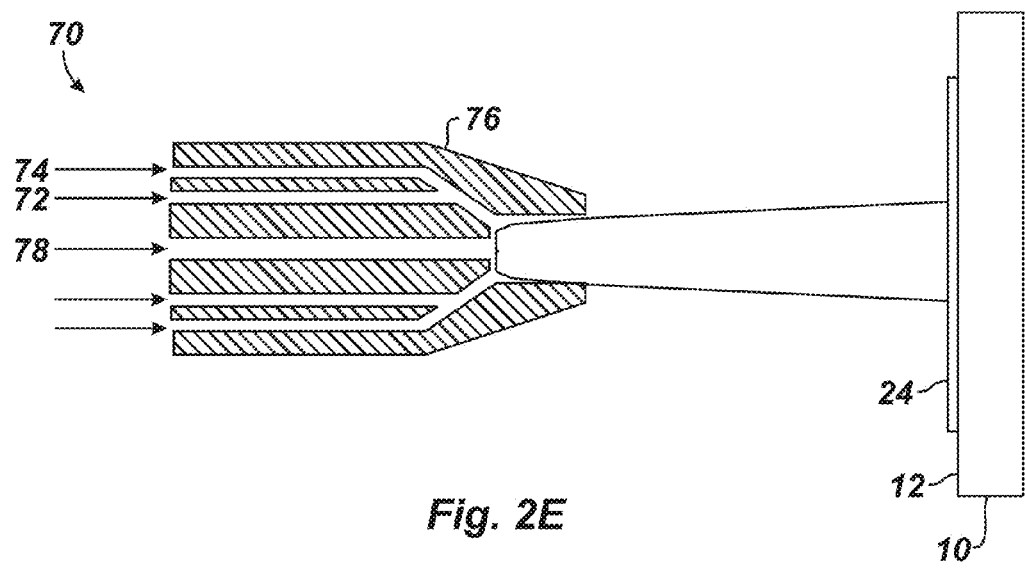
FIG. 2E illustrates a high velocity oxy-fuel (HVOF) process according to the present disclosure.

FIG. 2E illustrates a high velocity oxy-fuel (HVOF) process 70 according to the present disclosure. In this process, oxygen 72 and a fuel gas 74 are fed in a nozzle 76 and are combusted to produce a high velocity jet. Powder particles 78 are then fed into the nozzle's jet and propelled in a molten state as an overlay 24 against the bearing surface 12 of the component 10.

Variations of the above-described weld fusion and non-weld fusion techniques are known and can also be used to surface treat the bearing surface 12 of the oilfield component 10 according to the present disclosure. Having a basic understanding of these processes, further details of the surface treatment, overlay material, and other aspects of the present disclosure will now be discussed.

3. Overlay Samples

Figure 3A:
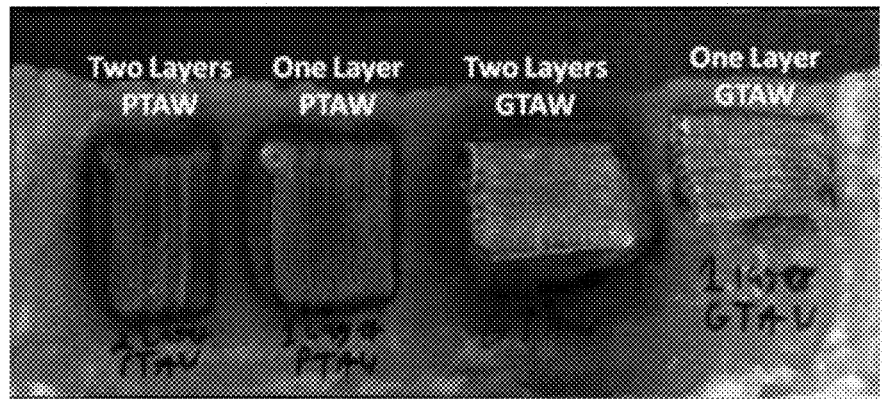
FIG. 3A shows a photo of a plate with overlay samples applied according to the present disclosure.

For reference, FIG. 3A shows a photo of a metal plate having overlay samples applied according to the present disclosure. The plate has a first overlay having two layers formed by the PTAW process, a second overlay having one layer formed by the PTAW process, a third overlay having two layers formed by the GTAW process, and a fourth overlay having one layer formed by the GTAW process. These overlays are shown in their raw state, which may go through some machining, grinding, or smoothing when formed on a bearing surface of an oilfield component.

The disclosed overlay is suited for oilfield equipment, downhole tools, and other components and can be used on bearing surfaces for a variety of oilfield equipment, which can be composed of a suitable base metal, such as stainless steel. For example, the disclosed overlays can be used on larger bearing surfaces of a rotating control device (RCD). In other applications, bearing surfaces on artificial lift pumps and tubular running service equipment can benefit from the disclosed overlays.

The disclosed alloy overlay has several advantages. For example, the overlay offers the same performance properties that an existing solid copper-nickel-tin alloy bearing can offer, but the overlay does not suffer from the size and cost limitations associated with a solid bearing. The disclosed overlay is particularly advantageous when equipment has a large surface area requiring the low friction bearing type properties.

As noted above, the alloy for applying the disclosed overlay can be supplied in rod or powder form depending on the welding process used to apply the overlay. For example, the alloy can be supplied in powder form for the PTAW application process and can be supplied in rod form for the GTAW application process.

Even though the overlay can be applied to a large bearing surface with the above-described application processes, a heat treatment is preferably performed on the overlay to produce suitable hardness for the desired bearing surface properties without damaging the underlying base metal. To meet this need, various application methods and heat treatment conditions have been analyzed with the results discussed below.

B. Analysis

Laser surface cladding trials were conducted with subsequent heat treating using the overlay material supplied as a powder, as in the process of FIG. 2A. The overlay exhibited a hardness of about 330 HV10 through subsequent hardening trials (33 HRC). Weld trials using both GTAW with rod (as in FIG. 2B) and PTAW with powder (as in FIG. 2C) were also conducted, and the resulting weld overlays were analyzed, as discussed in more detail below.

The structure and hardness of the weld overlays were analyzed on a number of overlay samples: (a) four overlay samples in "as-applied" condition (PTAW and GTAW methods with one and two applied layers); (b) four overlay samples in an "aged-only" condition; and (c) four overlay samples in "quenched (in water) and sequentially aged" condition.

The regime for aging and the regime for aging and solution treatment are shown in Table 1, which indicates basic parameters of heat treatments used.

TABLE 1

| Heat Treatment Regime Heat Treatments | | | |
|---|---|---|---|
| Age | | | |
| | Soaking | Solution Anneal | |
| Temperature F. (C.) | (hrs) | Temperature F. (C.) | Soaking (hrs) |
| 740 (393) | 4 | 1475 (802) | 0.5 |

1. Test Procedure

The overlays' structures were analyzed using a metallographic microscope with a quantitative analysis system. The overlays' hardness was analyzed using micro-hardness and Vickers hardness methods.

Figure 3B:
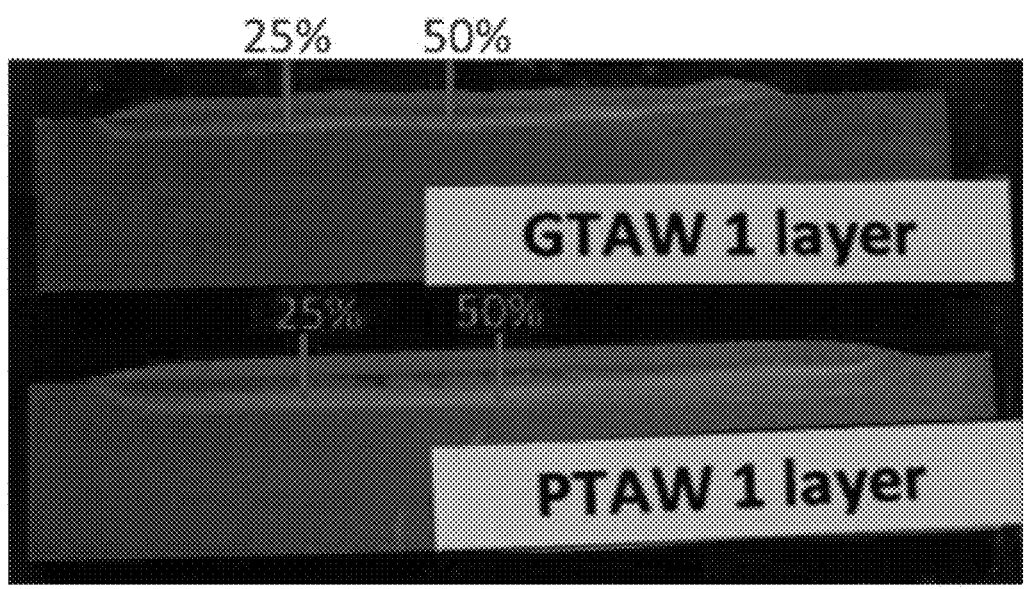
FIG. 3B shows a photo of overlay samples having lines indicating locations where hardness measurements were made during analysis.

The overlays' hardness was measured from the outer surface of the overlay to a fusion zone. As shown on FIG. 3B, for example, photo of samples include lines indicating the locations where hardness measurements were made in two example samples. The particular results of hardness measurements made on the overlay samples are presented in FIGS. 4A through 7B.

Figure 4A:
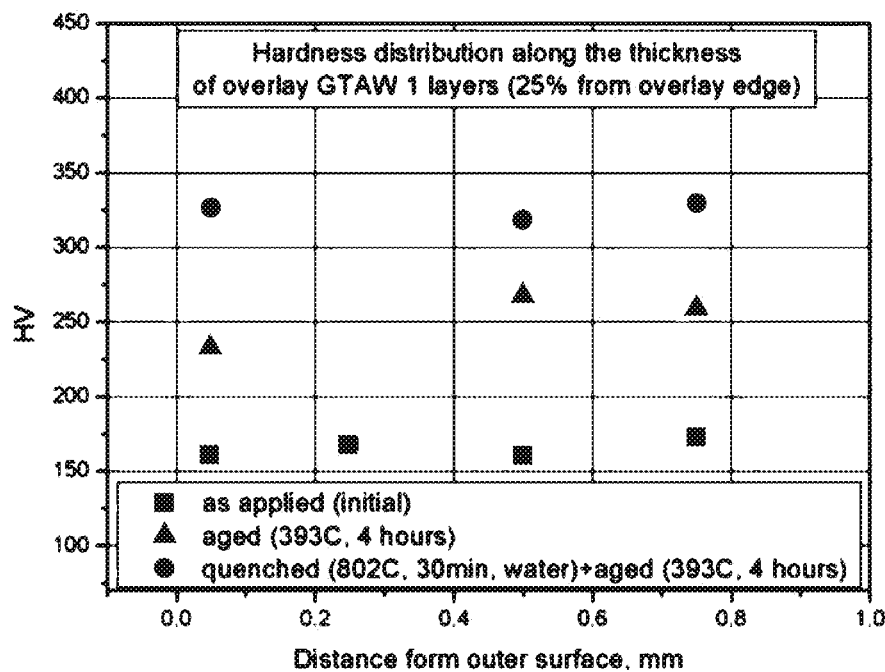
FIGS. 4A-4B show results of hardness measurements of an overlay applied by the GTAW process as one layer.
Figure 4B:
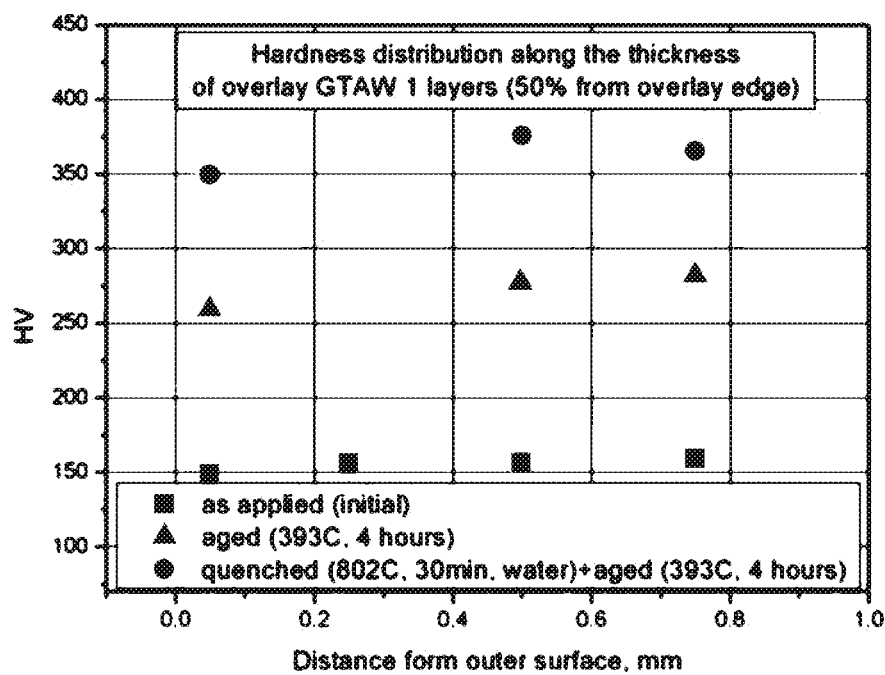

FIGS. 4A-4B show results of hardness measurements of an overlay applied by the GTAW process as one layer. FIG. 4A shows measurement results at the distance of 25% from the overlay's edge, and FIG. 4B shows measurement results at the distance of 50% (middle) from the overlay's edge.

Figure 5A:
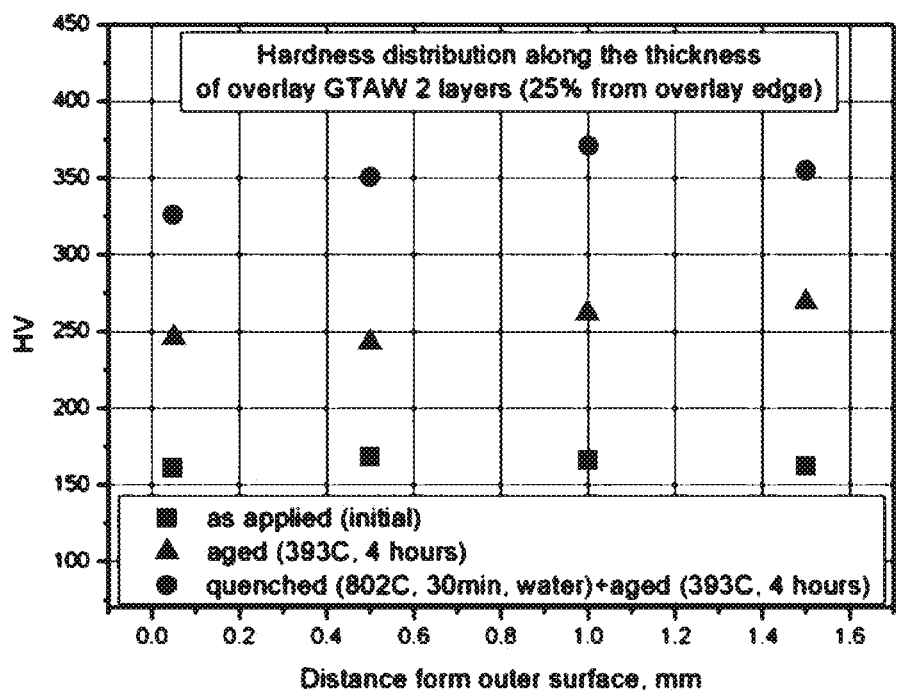
FIGS. 5A-5B shows results of hardness measurements of an overlay applied by the GTAW process as two layers.
Figure 5B:
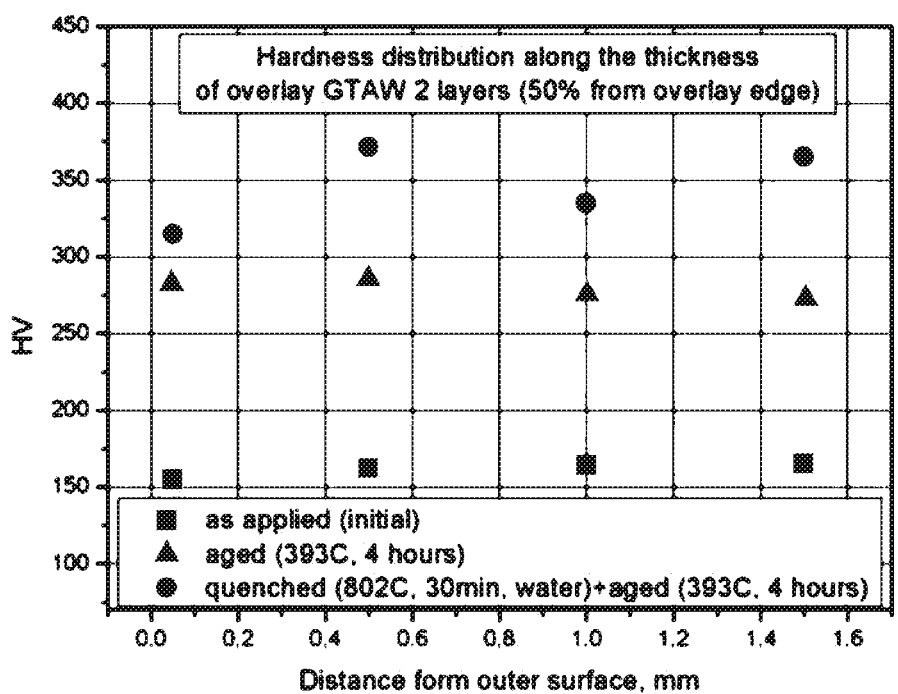

FIGS. 5A-5B shows results of hardness measurements of an overlay applied by the GTAW process as two layers. FIG. 5A shows measurements results at the distance of 25% from the overlay's edge, and FIG. 5B shows measurement results at the distance of 50% (middle) from the overlay's edge.

Figure 6A:
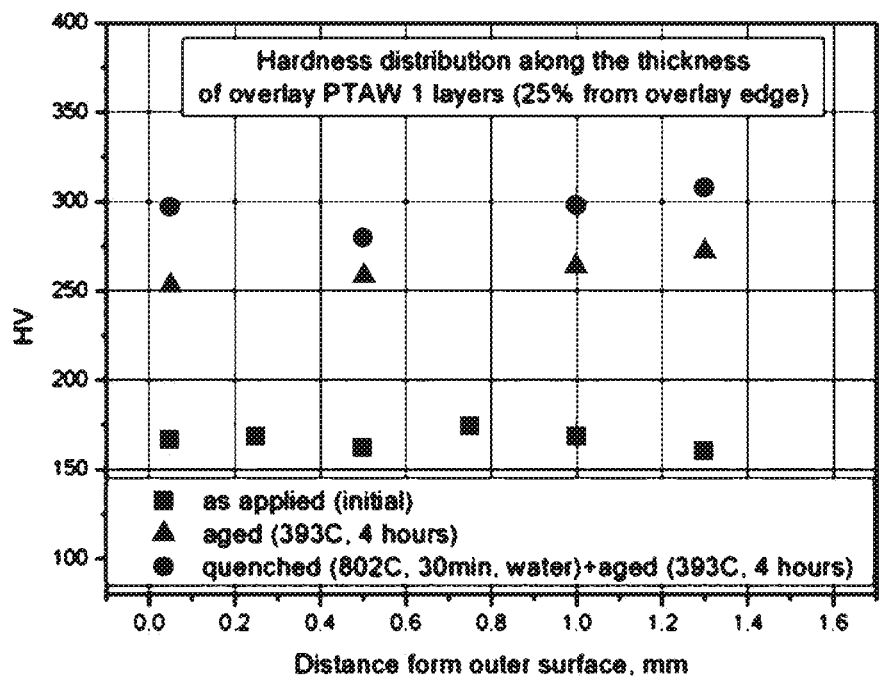
FIGS. 6A-6B show results of hardness measurements of an overlay applied by the PTAW process as one layer.
Figure 6B:
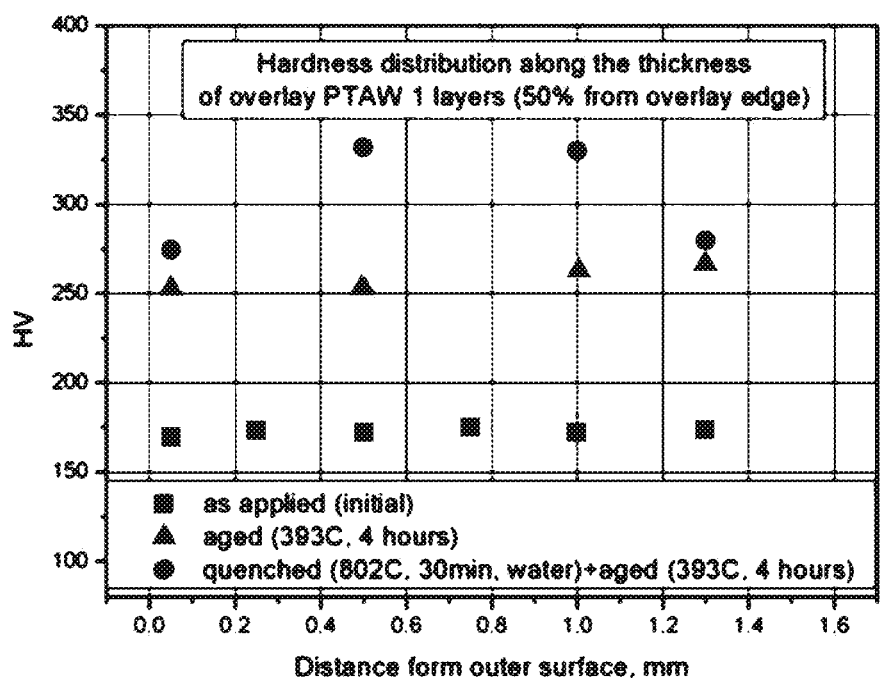

FIGS. 6A-6B show results of hardness measurements of an overlay applied by the PTAW process as one layer. FIG. 6A shows measurements results at the distance of 25% from the overlay's edge, and FIG. 6B shows measurement results at the distance of 50% (middle) from the overlay's edge.

Figure 7A:
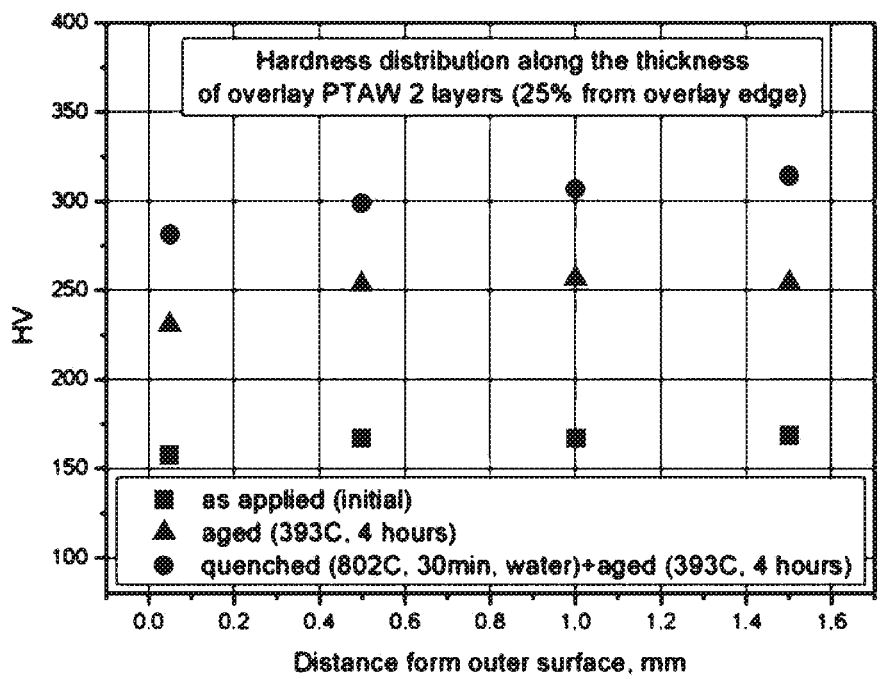
FIGS. 7A-7B show results of hardness measurements of an overlay applied by the PTAW process as two layers.
Figure 7B:
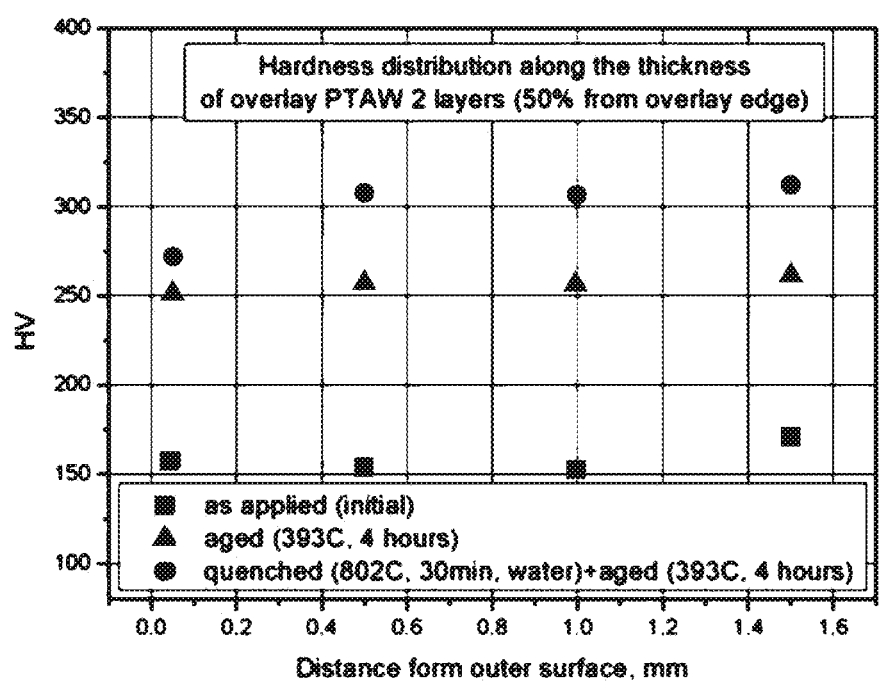

FIGS. 7A-7B show results of hardness measurements of an overlay applied by the PTAW process as two layers. FIG. 7A shows measurement results at a distance of 25% from the overlay's edge, and FIG. 7B shows measurement results at a distance of 50% (middle) from the overlay's edge.

The results of the hardness measurements indicated that the "as-applied" condition exhibits no significant differences between hardness in both variants (one and two layers) and in both methods of application (GTAW or PTAW). For the "as-applied" condition, the hardness of the overlay typically falls in the range of 155-165 HV.

The hardness of the overlays applied by the PTAW process in the "aged-only" condition is practically the same for both variants (one and two layers) and are within the range of 250-260 HV. The hardness of the overlays applied by the GTAW process in the "aged-only" condition is practically the same for both variants (one and two layers) and are within the range of 300-310 HV. The inventors believe that the water atomized powder used in this first series of tests using the PTAW application process resulted in the lower hardness achieved here compared with the GTAW-applied overlays. Trials using gas atomized powder appear to have similar to better results compared with GTAW-applied overlays.

The hardness of overlays applied by the PTAW process in the "quenched and sequentially aged" condition is practically the same for both variants (one and two layers) and are within the range of 300-320 HV. Finally, the hardness of overlays applied by the GTAW process in the "quenched and sequentially aged" condition is practically the same for both variants (one and two layers) and are within the range of 350-360 HV.

From the tests, the hardness of the overlays is increased by approximately 70% after ageing in comparison to the "as-applied" condition for all samples and the studied application methods. The hardness of the overlays after quenching with aging is increased twice for the PTAW-applied samples as compared to the "as-applied" condition. Finally, hardness of overlays after quenching with aging is increased by approximately 130% for the GTAW-applied samples compared to the "as-applied" condition.

Overall, the PTAW application process may be preferred because the heat used in the process can be more readily controlled. The powder material used in the PTAW application process is preferably uniform in composition, particle size, and particle shape, which is preferably spherical.

2. Structural Analysis

Figure 8A:
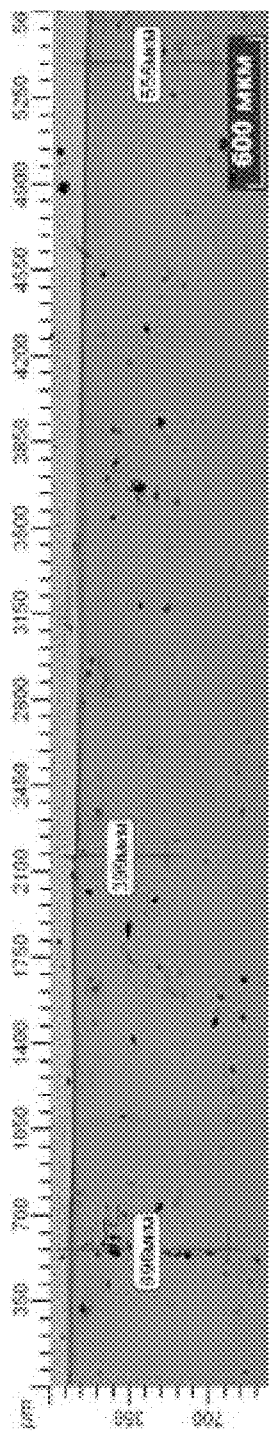
FIGS. 8A-8B show cracks in the base metal from fusion lines in overlay samples applied by the PTAW process.
Figure 8B:
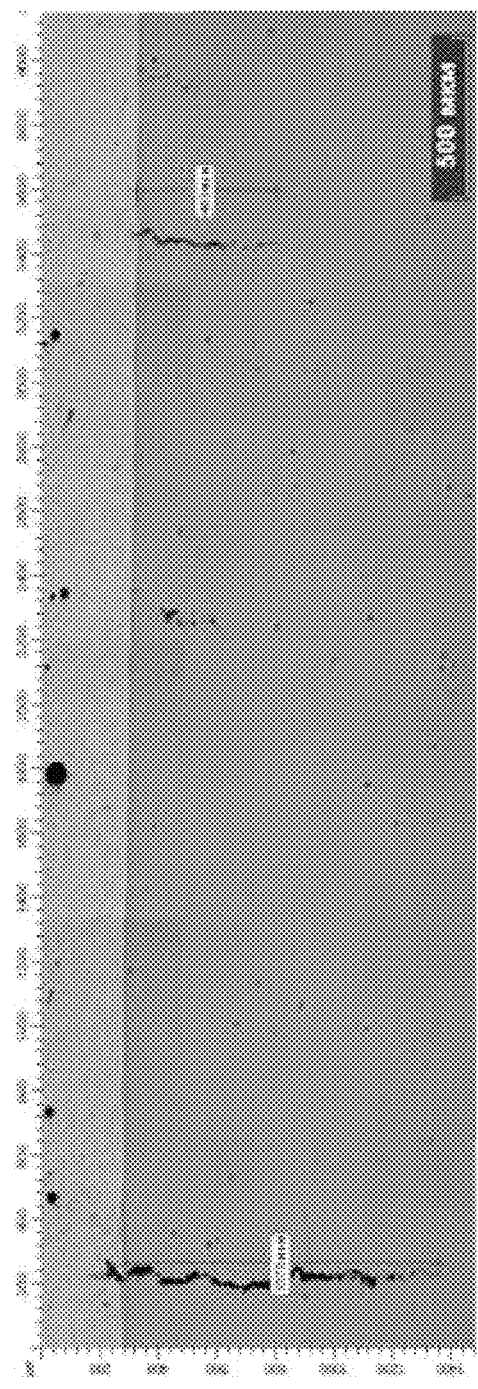

The structure of the overlays was studied on samples without etching and after etching. Cracks in the base metal from the fusion line were discovered on PTAW samples only. In particular, FIGS. 8A-8B shows cracks in the base metal from the fusion lines in the samples having the PTAW-applied overlays. FIG. 8A is an overlay having a single layer, and FIG. 8B is an overlay having two layers.

The structural study of unetched samples in "as-applied" condition showed the presence of gray intermetallic phase. It may be $Cu_3Sn$ or $Cu_6Sn_5$ due to Ni presence or Ni—Sn phases. Phase composition depends on the chemical composition of the overlay material. The inventor believes that the inhomogeneity and particle shape inherent in the water atomized powder used for this first series resulted in the observed cracking here. As previously noted, trials using gas atomized powder appear to have solved the problem with formation of cracks into the base metal.

Figure 9A:
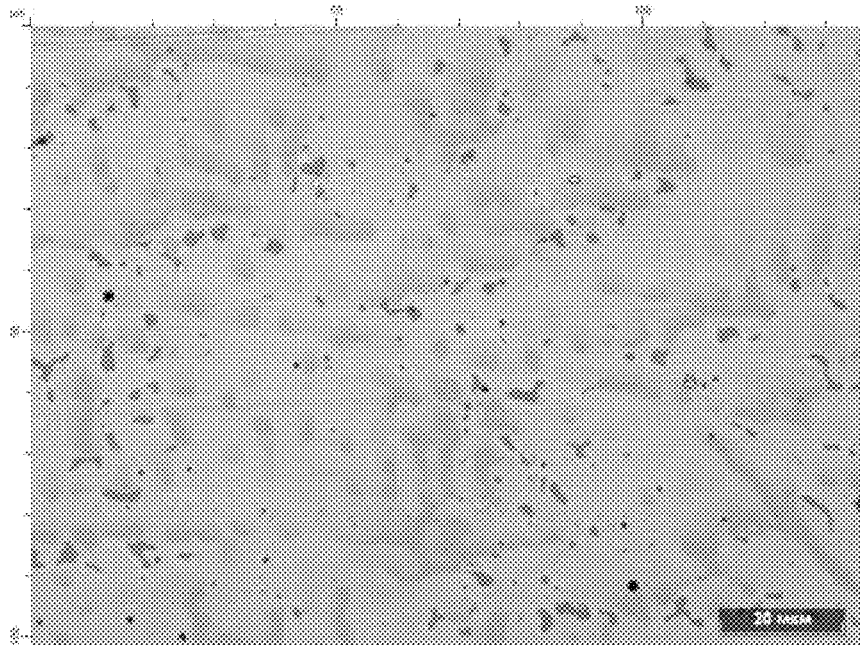
FIGS. 9A-9C show the structure of unetched overlay samples in the following conditions: as-applied (FIG. 9A); aged-only (FIG. 9B); and quenched and aged (FIG. 9C).
Figure 9B:
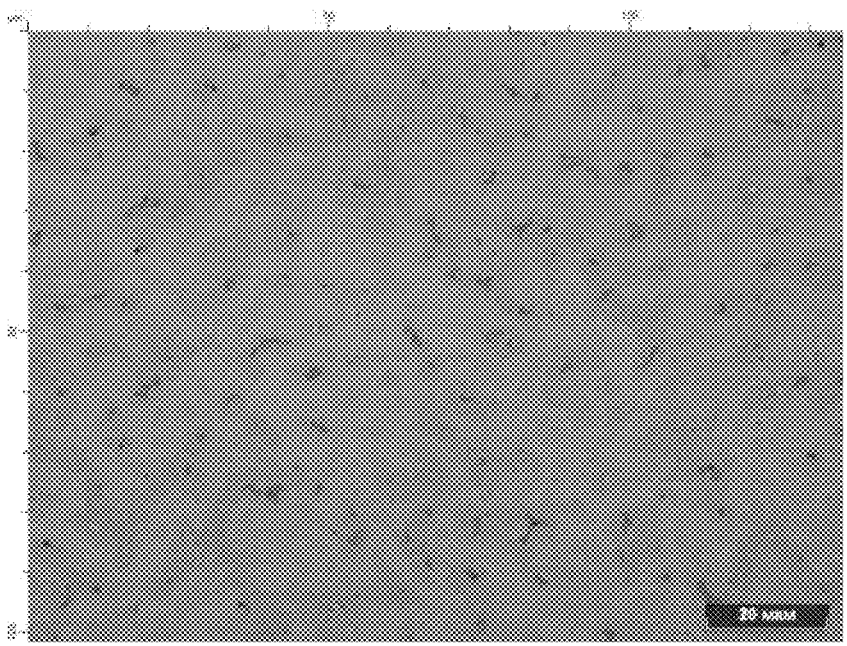
Figure 9C:
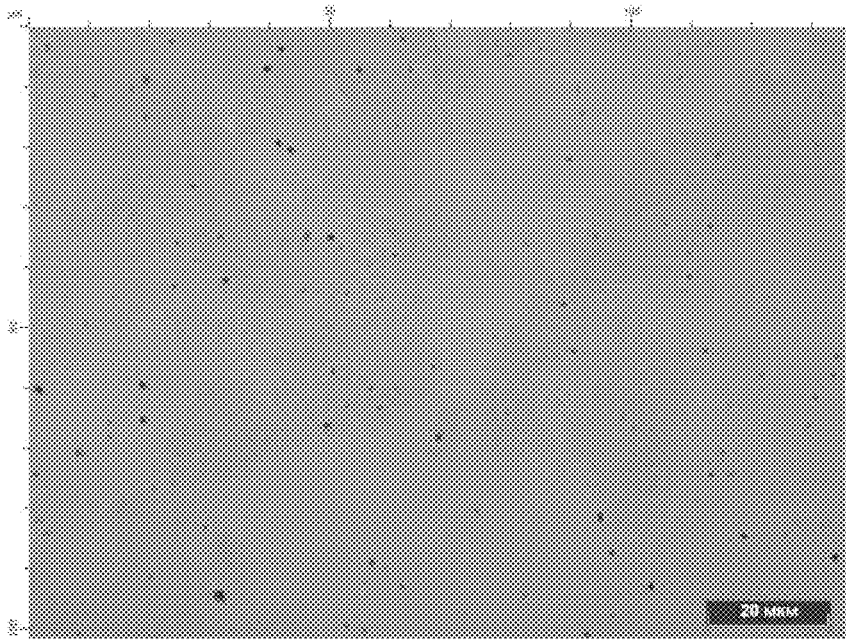

FIGS. 9A-9C show the structure of unetched samples in the following conditions: as-applied (FIG. 9A); aged-only (FIG. 9B); and quenched and aged (FIG. 9C). Gray intermetallic phase is present in the as-applied conditions (FIG. 9A). The size and amount of this phase is decreased after aging (FIG. 9B). Finally, this gray intermetallic phase is absent after quenching with aging (FIG. 9C). Presented regularity is characteristic for all studied samples and methods.

Analysis of the porosity of the overlays applied by the GTAW and PTAW processes is shown in Table 2 of FIG. 11. In particular, Table 2 presents the level of porosity observed in the first trials with the PTAW and GTAW processes. The GTAW-applied overlays in both the one and two layers are free of porosity except for isolated pores on the edge of the overlay. The PTAW-applied overlays in the one and two layers exhibited porosity levels in the 2% (one layer) and 4% (two layer) range. The inventor believes that the water atomized powder directly contributed to the porosity, and no porosity has been reported in overlays applied utilizing gas atomized powder during PTAW application.

Figure 14:
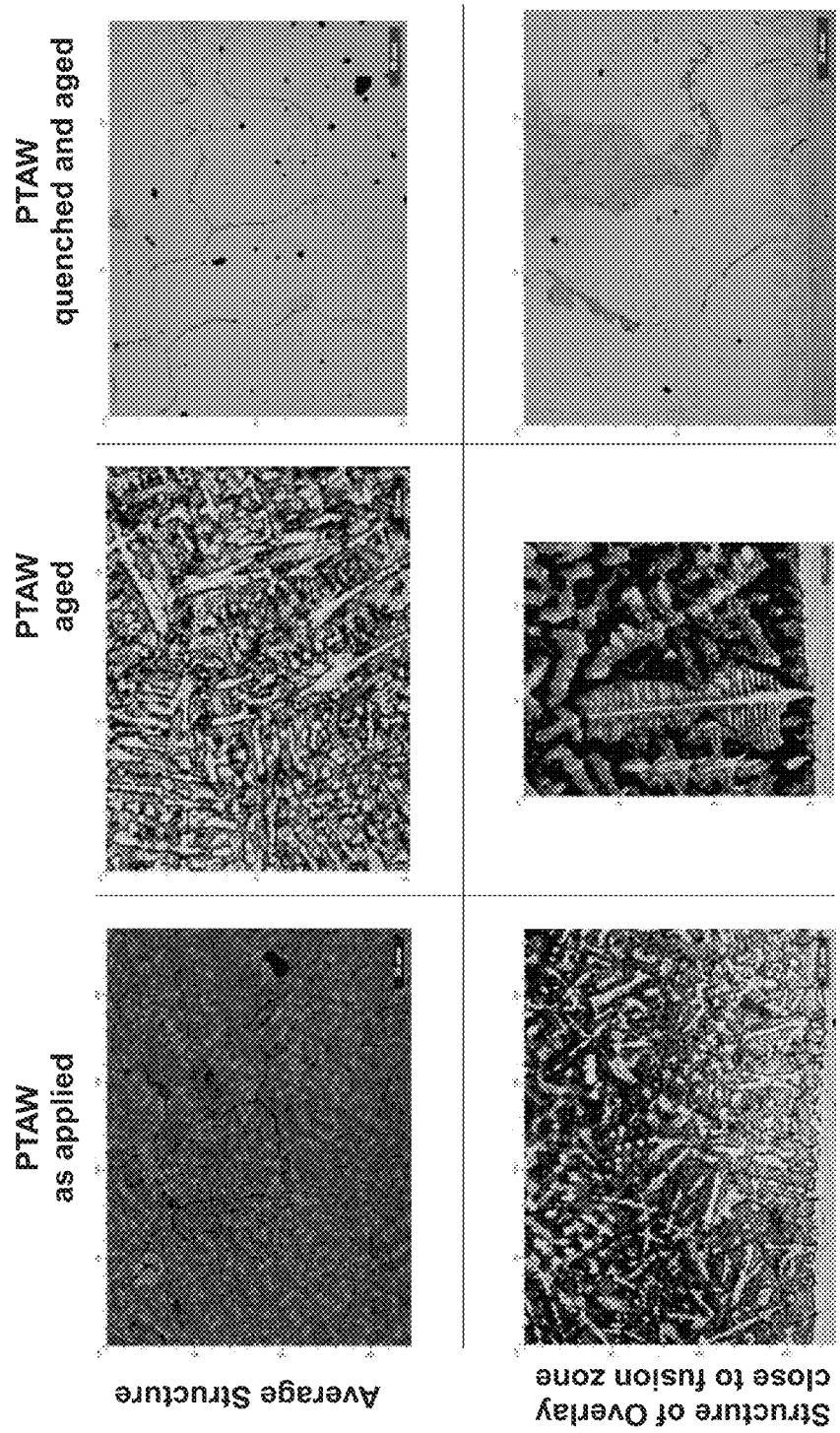
FIG. 14 illustrates a table showing the etched structure of the PTAW-applied overlays after heat treatment.

Table 3 in FIG. 12 presents the quantitative analysis of gray phase evolution. FIG. 13 includes Table 4 showing analysis of etched structure of the GTAW-applied overlays after heat treatment. FIG. 14 includes Table 5 showing analysis of etched structure of the PTAW-applied overlays after heat treatment.

Figure 10:
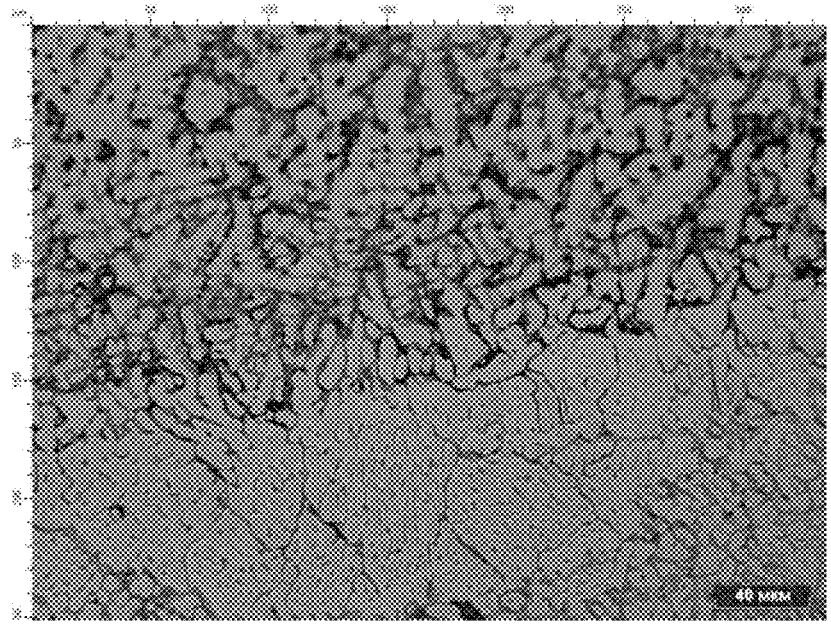
FIG. 10 is photo is of a GTAW-applied overlay showing a visible boundary between two layers.

The structure is similar for samples with one and two layers for similar application methods. Only one of the GTAW samples had a visible boundary between two layers with a length of approximately 600 µm discovered on the end of overlay, as shown in FIG. 10. The photo here is of a GTAW-applied overlay structure and shows the visible boundary between two layers. As noted previously, some of the deficiencies noted in the PTAW-applied overlays are believed to be due to the supplied powder being inhomogeneous or not preferably uniform. In which case, the characteristics of the PTAW-applied overlays are expected to be improved with more homogeneous powder being used in the process.

3. Hardening Heat Treatments

Solution and spinodal hardening heat treatments can be used on the overlays of the present disclosure. Rapid cooling such as water quenching is advised after each. The response of the alloy depends on the temperature and time of the heat treatment.

A suitable temperature for hardening a layer of the disclosed overlay may be about 880 deg F. for about seven minutes depending on the thickness of the layers. In general, the thicknesses of the overlays are expected to be about 0.125 inch for two layers and about 0.065 inch for one layer. It is believed that shallower (less than about 1/16") overlay passes are possible with lower heat inputs, especially with the PTAW process.

In another treatment, the overlay can be first annealed and quenched before spinodal hardening. The annealing cycle may last for about ten minutes at about 1550° F. for an overlay with a 0.125 inch thickness. The temperature preferably does not go much above 1600 deg F. The cooling rate from the spinodal hardening cycle preferably gets below 800 F in about 1 minute when annealing. For aging, the cooling rate may be less crucial because the time at temperature can be reduced if the cooling rate is slow.

In another early trial, a laser was used as a heat source to result in hardening of the overlay. Initial success was noted from these trials, but the initial water atomized powder quality presented difficulties with respect to homogeneity of the final product.

4. Galling Tests

Galling tests show the benefits of the weld overlay of the present disclosure applied especially with the weld fusion techniques as disclosed herein. Impressively, cracking of the underlying bearing material occurred at stresses before galling was observed. In particular, adhesive wear tests (e.g., galling tests) were performed on the disclosed Cu—Ni—Sn overlays against low alloy steel and cemented tungsten carbide (HVOF applied surfacing). The Cu—Ni—Sn overlays were applied using both wire consumable filler metal with the GTAW (gas tungsten arc welding process) and gas atomized powder filler metal with the PTAW (plasma transferred arc welding) process.

TABLE 6

Comparative Galling Tests

| Couple | Galling Stress MPa (ksi) | Contact stress of overlay cracking, MPa (ksi) |
|---|---|---|
| Cu—Ni—Sn overlay (PTAW; aged only) vs. | 290 (42) | No cracks |
| Baseline Cu—Be Bearing Material | 290 (42) | |
| Cu—Ni—Sn overlay (PTAW; quenched and aged) vs. | 305 (44) | No cracks |
| Baseline Cu—Be Bearing Material | 290 (42) | |
| Cu—Ni—Sn overlay (GTAW; aged only) vs. | 350 (51) | No cracks |
| Baseline Cu—Be Bearing Material | 350 (51) | |
| Cu—Ni—Sn overlay (GTAW; quenched and aged) vs. | 380 (55) | Crack at 365 (53) |
| Baseline Cu—Be Bearing Material | 380 (55) | |

Baseline galling resistance was performed using a copper-beryllium bearing material for comparative results. These baselines of galling resistance were compared to first results of overlays applied with the PTAW process with aged only treatment and quenched and aged treatment. These first results demonstrated that the galling resistance of the overlays applied with PTAW process was equal to the baseline galling resistance of the copper-beryllium bearing material.

Baselines of galling resistance were also compared to second results of overlays applied with the GTAW process with aged only treatment and quenched and aged treatment. These second results demonstrated that the GTAW applied overlays were superior to the baseline copper-beryllium bearing material.

The best adhesive wear resistance was found for the GTAW applied process in the welded plus quenched and aged condition. In testing the overlay applied in this manner, the galling stress could not be determined because it exceeded the load bearing capacity of the mated tungsten carbide surface applied using HVOF (high velocity oxy-fuel) process.

In the galling tests, the variations observed may be due to the quality of the gas-atomized powder being tested. Indications show that a Flux-cored arc welding (FCAW) process could provide similar results to the GTAW process.

C. Summary and Conclusions

The teachings of the present disclosure pertain to the use of surfacing techniques to apply a low coefficient of friction overlay using a weld fusion process. As the above disclosure demonstrates, the presented techniques can successfully overlay base metal with copper-nickel-tin alloys and can achieve desirable bearing properties.

The inventor has identified several oil and gas segments that can potentially utilize the teachings of the present disclosure and the disclosed overlays and derive the resultant benefits of the overlay's low friction bearing qualities. Examples of products already identified include rotation control devices, tubular running service equipment, measuring while drilling (MWD), logging while drilling (LWD), rotary steerable products, low torque and drag tools, and wireline tools. As will be appreciated, these and other products can benefit from the teachings of the present disclosure.

Figure 15:
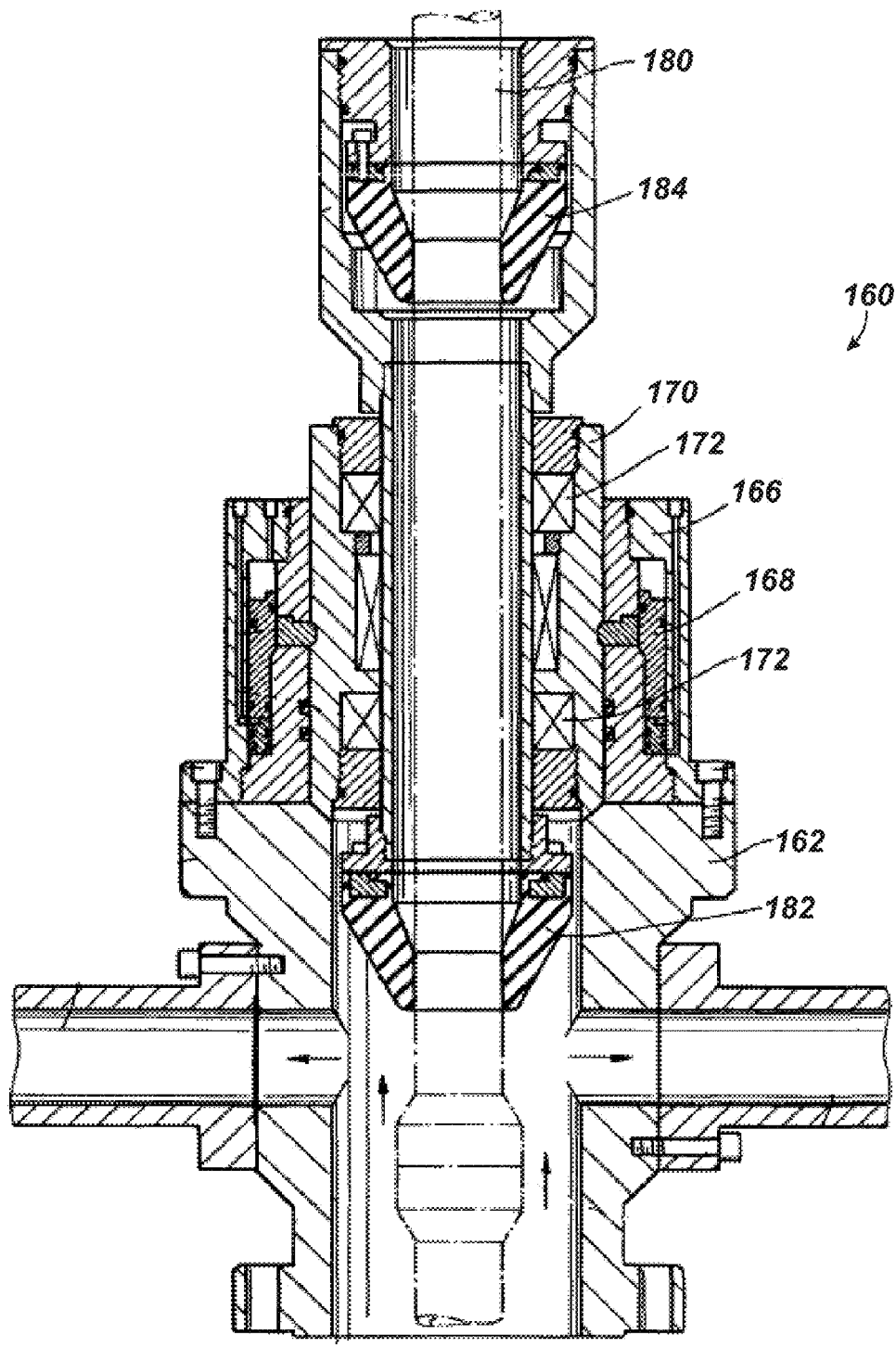
FIG. 15 illustrates an example of a rotating control device having bearing surfaces benefiting from the surface treatment according to the present disclosure.

For example, FIG. 15 illustrates an example of a rotating control device assembly 160 as disclosed in U.S. Pat. No. 7,926,593, which is incorporated herein by reference. In general, the assembly 160 has a rotating control device 170 latched with a latching assembly 168 into a docking housing 166 mounted on a bell nipple 162. Bearing assemblies 172 and seals 182, 184 in the rotating control device 170 are fit around tubing 180 passing through the assembly 160. Various bearing surfaces associated with and surrounding the bearing assemblies 172 can benefit from the surface treatment according to the present disclosure.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of treating a bearing surface of an oilfield component, the method comprising:
    applying a surface treatment having a low coefficient of friction to the bearing surface of the oilfield component by weld fusing an overlay of a Cu—Ni—Sn alloy material to the bearing surface.

2. The method of claim 1, wherein weld fusing the overlay of the Cu—Ni—Sn alloy material to the bearing surface comprises laser surface cladding the overlay of the Cu—Ni—Sn alloy material to the bearing surface.

3. The method of claim 1, wherein weld fusing the overlay of the Cu—Ni—Sn alloy material to the bearing surface comprises arc welding the overlay of the Cu—Ni—Sn alloy material to the bearing surface.

4. The method of claim 3, wherein arc welding the overlay of the Cu—Ni—Sn alloy material to the bearing surface comprises gas tungsten arc welding the overlay of the Cu—Ni—Sn alloy material to the bearing surface.

5. The method of claim 3, wherein arc welding the overlay of the Cu—Ni—Sn alloy material to the bearing surface comprises plasma tungsten arc welding the overlay of the Cu—Ni—Sn alloy material to the bearing surface.

6. The method of claim 5, wherein plasma tungsten arc welding the overlay comprises using a gas atomized powder of the Cu—Ni—Sn alloy material.

7. The method of claim 1, wherein weld fusing the overlay comprises applying the overlay as one or more layers.

8. The method of claim 7, wherein applying the overlay as the one or more layers comprises applying the one or more layers for an overall thickness of 0.065 inch to 0.125 inch.

9. The method of claim 1, further comprising heat treating the overlay.

10. The method of claim 9, wherein heat treating the overlay comprises using solution or spinodal hardening heat treatments.

11. The method of claim 9, further comprising rapid cooling the overlay after heat treating the overlay.

12. The method of claim 9, wherein heat treating the overlay comprises first annealing the overlay, second quenching the overlay, and third spinodal hardening the overlay.

13. The method of claim 9, wherein heat treating the overlay comprises using localized heating from a laser or induction surface heat treatment.

14. The method of claim 1, wherein the Cu—Ni—Sn alloy material comprises 15% Ni and 8% Sn with a remaining balance of Cu.

15. The method of claim 1, further comprising initially applying a boundary layer of a nickel-based alloy to the bearing surface before weld fusing the overlay of the Cu—Ni—Sn alloy material to the bearing surface.

16. The method of claim 15, wherein applying the boundary layer of the nickel-based alloy to the bearing surface comprises weld fusing the boundary layer to the bearing surface.

17. The method of claim 16, wherein weld fusing the overlay of the Cu—Ni—Sn alloy material to the bearing surface comprises laser surface cladding, arc welding, gas tungsten arc welding, or plasma tungsten arc welding the overlay of the Cu—Ni—Sn alloy material to the bearing surface.

18. An oilfield component having a bearing surface treated according to a treatment method according to claim 1.

19. The oilfield component of claim 18, wherein the oilfield component is a component of oilfield equipment selected from the group consisting of a rotation control device, tubular running service equipment, measuring while drilling (MWD) tool, logging while drilling (LWD) tool, rotary steerable tool, low torque and drag tool, and wireline tool.

20. A method of treating a bearing surface of an oilfield component, the method comprising:
    applying a boundary layer of a nickel-based alloy to the bearing surface of the oilfield component; and
    applying a surface treatment having a low coefficient of friction to the bearing surface having the applied boundary layer by weld fusing an overlay of a Cu—Ni—Sn alloy material to the bearing surface.

21. A method of treating a bearing surface of an oilfield component, the method comprising:
    applying a surface treatment having a low coefficient of friction to the bearing surface of the oilfield component by mechanically bonding an overlay of a Cu—Ni—Sn alloy material to the bearing surface with a spray process.

22. The method of claim 21, wherein mechanically bonding the overlay of the Cu—Ni—Sn alloy material to the bearing surface with the spray process comprises spraying the Cu—Ni—Sn alloy with a twin-wire arc spray process.

23. The method of claim 21, wherein mechanically bonding the overlay of the Cu—Ni—Sn alloy material to the bearing surface with the spray process comprises spraying the Cu—Ni—Sn alloy with a high velocity oxy-fuel process.

24. The method of claim 15, wherein applying the boundary layer of the nickel-based alloy to the bearing surface comprises mechanically bonding the nickel-based alloy material to the bearing surface with a spray process.

25. The method of claim 15, wherein applying the boundary layer of the nickel-based alloy to the bearing surface comprises applying the nickel-based alloy of predominately nickel in a thickness of 1/32 to 3/16-in.

26. The method of claim 20, wherein weld fusing the overlay of the Cu—Ni—Sn alloy material to the bearing surface having the applied boundary layer comprises allowing the copper from the weld overlay alloy coming out of solution during solidification at a grain boundary to be soluble in the nickel of the boundary layer.

* * * * *